United States Patent
Pardee

[11] 3,762,168
[45] Oct. 2, 1973

[54] WATER POLLUTION CONTROL

[76] Inventor: Richard L. Pardee, 8716 Newton Falls Rd., P.O. Box 4, Wayland, Ohio 44285

[22] Filed: Sept. 10, 1971

[21] Appl. No.: 179,343

[52] U.S. Cl. .......................... 61/1 F, 61/24, 61/46
[51] Int. Cl. ........................................ E02b 15/04
[58] Field of Search ................. 61/1 F, 1, 2, 5, 61/24; 114/240, 241, 5 F, 46; 9/15; 210/154, 155, 156, 170

[56] References Cited
UNITED STATES PATENTS

| | | | |
|---|---|---|---|
| 3,184,923 | 5/1965 | Galvaing | 61/1 F |
| 2,984,076 | 5/1961 | Bradley | 61/48 |
| 2,693,161 | 11/1954 | Stubbs | 61/1 F |
| 2,857,872 | 10/1958 | Usab | 114/5 F |
| 3,599,434 | 8/1971 | Missud | 61/1 F |
| 3,170,299 | 2/1965 | Clarke | 61/1 |
| 1,269,855 | 6/1918 | Rehwaldt | 61/24 |
| 813,842 | 2/1906 | Travis | 61/24 |

*Primary Examiner*—Jacob Shapiro
*Attorney*—Michael Williams

[57] ABSTRACT

The invention relates to devices for removing pollutants from water, particularly navigable streams, rivers and lakes. In one form, the invention comprises a skimming device which is disposed at an acute angle to the flow of water and is operable to direct the pollutants skimmed from the water to a collecting area such as a reservoir, from where it may be removed from time to time. In another form, the device is operable to protect an off-shore working area, such as an oil well rig, against pollution of the water, by disposition of a skimming device in surrounding relation with respect thereto.

2 Claims, 3 Drawing Figures

PATENTED OCT 2 1973　　　　　　　　　　　　　　　3,762,168

INVENTOR.
RICHARD L. PARDEE
BY Michael Williams
ATTORNEY 3,762,168

WATER POLLUTION CONTROL

BACKGROUND AND SUMMARY

Skimming devices have heretofore been used, but insofar as I am aware, these devices have been placed in rivers and streams to collect debris which floats on the water, and such debris had to be periodically removed from the skimming device since otherwise the latter becomes clogged and largely ineffective. In contrast, my invention provides a skimming device wherein the floating debris is directed away from the device and is collected at a point spaced therefrom so that the device is self-cleaning and therefore efficiently operable at all times.

My invention also provides a skimming device which may be placed completely across a navigable stream, and yet permit boats to pass therethrough.

DESCRIPTION OF THE DRAWING

In the drawing accompanying this description and forming a part of this specification, there are shown, for purpose of illustration, several embodiments which my invention may assume, and in this drawing.

DESCRIPTION OF PREFERRED EMBODIMENT

Figure 1:
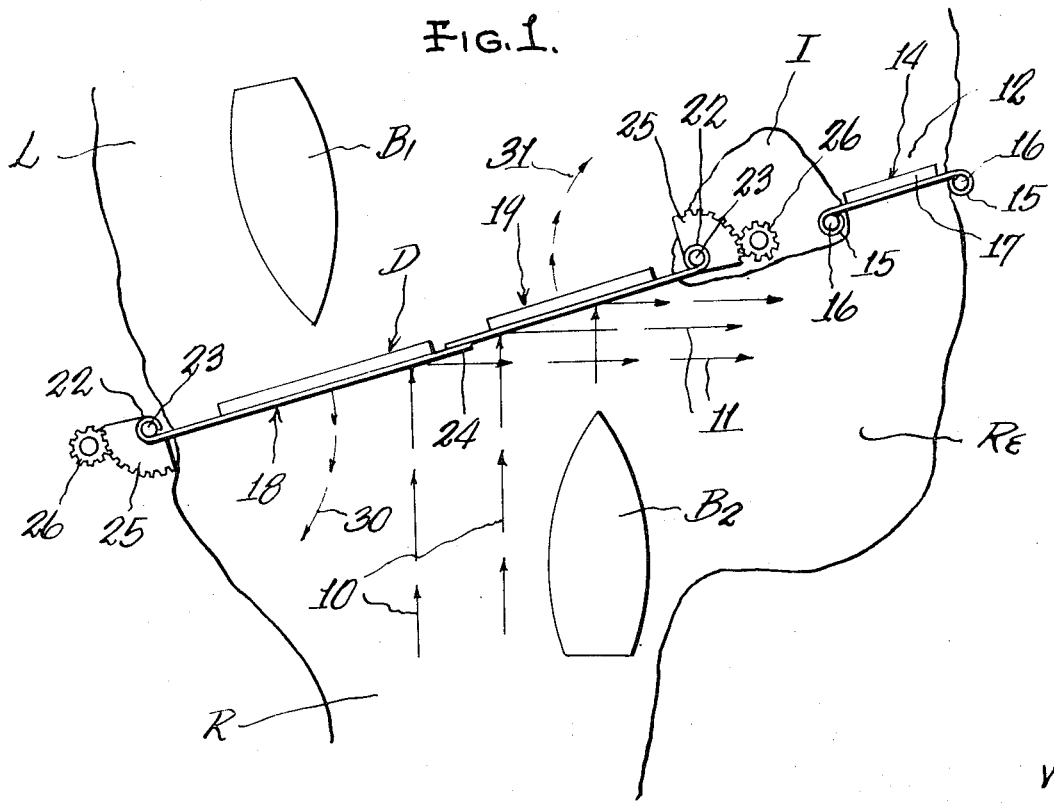
FIG. 1 is a plan view of a water-way illustrating one embodiment of my invention.

In FIG. 1, a river R is shown as flowing into a lake L, with my improved skimming device D disposed crosswise of the river. A collecting area, such as a reservoir Re is in communication with the river, and an island I, either natural or man-made, is disposed between the reservoir and the lake. The flow of water in the river is indicated by the arrows 10 and it will be noted that the improved skimming device is disposed crosswise of such flow and at an acute angle thereto so that as the upper portion of the water strikes the barrier formed by the skimming device, it and any debris or pollutants floating thereon are directed toward the reservoir, as indicated by the arrows 11.

A relatively small water-way 12 is formed between the island I and the adjacent shore, and a skimming barrier 14 is disposed thereacross. The barrier may be formed of rigid strip material, either metal or non-metal, of sufficient width so that a lower portion is disposed below the surface of the water, but spaced from the bottom, to permit water to flow therebeneath from the reservoir to the lake. An upper portion of the barrier is disposed above the level of the water to block passage of floating debris and pollutants from the reservoir to the lake.

The barrier 14 is preferably mounted so that it will automatically rise and fall with the changing level of the water-way 12, so that the barrier always maintains a definite relationship with the upper surface of the water and therefore is always operable to skim floating debris and pollutants. Periodically, the debris and pollutants accumulated with the reservoir Re may be removed. The rigid debris, such as logs and the like, may be removed by a power shovel, and the liquid pollutants, such as oil and the like, may be removed by a pumping operation.

In the form illustrated in the drawing, the barrier is formed with vertical loops or sleeves 15 at its opposite ends to receive upright posts 16 rigidly supported by the island and river bank, respectively. Suitable bearings may be interposed between the posts and loops to permit free vertical movement of the barrier. A floatation device 17 is attached to the barrier 14 to cause it to rise and fall with any change in level of the water.

The skimming device D may be in the form of an unbroken barrier across the river mouth, in the event there is no navigation on the river. However, it is preferred to form the device D in a plurality of sections, such as the two indicated at 18 and 19, and to support such sections for swinging movement to permit boats to pass to and from the river.

Figure 2:
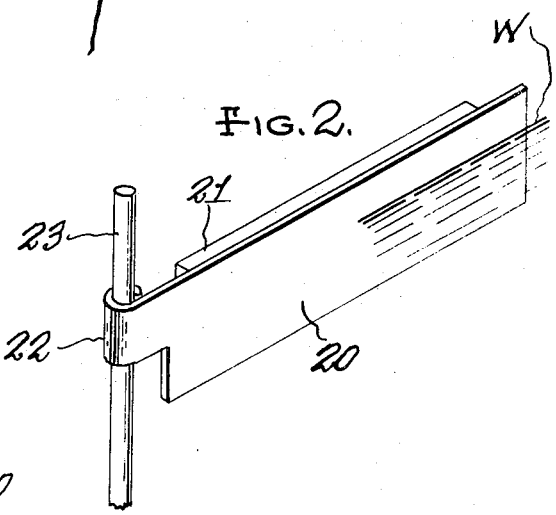
FIG. 2 is a perspective view of a portion of the skimming device shown in FIG. 1.

Each barrier section may be formed as shown in FIG. 2, to comprise a rigid strip 20, of metal or non-metal, of sufficient width so that upper and lower parts, are respectively disposed above and below the level of the water W. The lower portion of the strip is spaced from the river bottom, so that water may flow therebeneath, and the upper part extends above the water level a suitable distance to block flow of floating debris and pollutants from passing from the river to the lake. A floatation device 21 is secured to each section 18,19, to cause it to rise and fall with any change in level of the water.

The sections 18 and 19 are mounted for shifting movement to provide passage for boats and, as seen in FIG. 1, one manner in which this may be accomplished is to provide an end of each section with a vertical loop or sleeve 22 to receive a vertical post 23. Suitable bearings may be disposed between respective posts and sleeves to permit free vertical movement of the sections. The respective posts 23 are shown in FIG. 1 as rigidly supported by the river bank and the island. The sections 18, 19 are of a length to overlap, as seen at 24, to form a complete barrier across the river.

The sections 18, 19 may be swung in any suitable manner, and illustrative of the same, as seen in FIG. 1, a gear segment 25 is rigidly secured to a sleeve 22 and is rotated by a motor driven gear 26. The motors may be manually controlled, such as by a watchman, or may be controlled by a radio signal from an approaching boat, or by an electric eye device.

When a boat, such as illustrated at B1, approaches for entrance to the river, the section 18 is swung in the direction shown by the arrow 30 to provide for passage of the boat. This, of course, will interrupt the complete barrier across the river so that a small amount of debris and pollutants may flow into the lake, but since the section 18 is open only for a relatively short time, this is not of any serious consequence. When a boat B2 approaches for entrance to the lake, the section 19 is swung in the direction of the arrow 31 to provide passage for the boat.

DESCRIPTION OF OTHER EMBODIMENT

Figure 3:
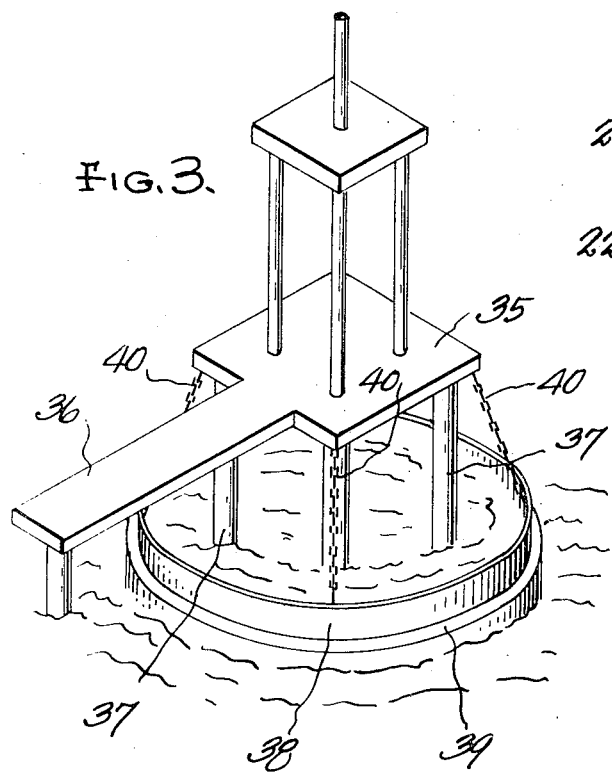
FIG. 3 is a perspective view of another embodiment of my invention.

FIG. 3 discloses an anti-pollution protection for an off-shore device, such as the oil well rig shown. The rig comprises a platform 35 which is adapted to support workmen, machinery and tools, and includes a walkway 36 for communication with a supply boat. The platform is supported by the usual pilings 37.

The barrier 38 in this case surrounds the pilings and may be circular, as shown and large enough in diameter to enclose an area of water that is subject to dripping of oil or falling of debris. As before, the barrier is made of rigid strip of metal or non-metal, and provided with a floatation device 39, so as to operate as a skimmer in the manner hereinbefore described. Chains or cables 40 secure the barrier to the platform 35. In operation, any debris falling from the oil well rig, or oil or other pollutants dripping therefrom, will be collected within the confines of the barrier, and may periodically be removed.

I claim:

1. An anti-pollution device for a stream of water flowing into another body of water, comprising:

a first barrier disposed across said stream and partly submerged in the water for skimming floating debris and pollutants therefrom while permitting water flow thereunder to said other body of water, said first barrier being disposed at an acute angle to the flow of water to divert an upper portion of the water striking it, and the debris and pollutants floating thereon, to a side of said stream, a reservoir disposed at said stream side and in communication therewith for collecting the diverted debris and pollutants, said reservoir having a portion in communication with said other body of water, and a second barrier across said reservoir portion to permit flow of water thereunder from said reservoir to said other body of water, but blocking passage of collected debris and pollutants.

2. The construction according to claim 11 wherein said first barrier is formed in sections, and wherein at least one of said sections is movable from barrier position to provide passage for a boat.

* * * * *